US011999248B2

(12) United States Patent
Wechsler et al.

(10) Patent No.: US 11,999,248 B2
(45) Date of Patent: Jun. 4, 2024

(54) INDUCTIVE POWER TRANSFER PAD AND METHOD FOR PRODUCING AN INDUCTIVE POWER TRANSFER PAD

(71) Applicant: IPT Technology GmbH, Efringen-Kirchen (DE)

(72) Inventors: Simon Wechsler, Esslingen (DE); Christian Rapp, Moerlenbach (DE)

(73) Assignee: ENRX IPT GmbH, Efringen-Kirchen (DE)

( * ) Notice: Subject to any disclaimer, the term of this patent is extended or adjusted under 35 U.S.C. 154(b) by 78 days.

(21) Appl. No.: 17/689,899

(22) Filed: Mar. 8, 2022

(65) Prior Publication Data

US 2022/0289047 A1     Sep. 15, 2022

Related U.S. Application Data

(63) Continuation of application No. PCT/EP2020/075116, filed on Sep. 8, 2020.

(30) Foreign Application Priority Data

Sep. 9, 2019  (GB) ...................................... 1912955

(51) Int. Cl.
  *B60L 53/12*   (2019.01)
  *B60L 53/302*  (2019.01)
  *H02J 50/10*   (2016.01)
(52) U.S. Cl.
  CPC ............. *B60L 53/12* (2019.02); *B60L 53/302* (2019.02); *H02J 50/10* (2016.02)
(58) Field of Classification Search
  CPC ........................................................ B60L 53/12

USPC ......................................................... 307/104
See application file for complete search history.

(56) References Cited

U.S. PATENT DOCUMENTS

| 5,654,621 A | 8/1997 | Seelig |
| 2012/0256586 A1 | 10/2012 | Becker et al. |
| 2019/0023139 A1* | 1/2019 | Wechsler ................ B60L 53/39 |
| 2019/0251035 A1 | 8/2019 | Ji et al. |

FOREIGN PATENT DOCUMENTS

| CN | 105634081 A | 6/2016 |
| DE | 102015210445 A1 | 12/2016 |
| EP | 3110656 A1 | 1/2017 |
| JP | 2013126351 A | 6/2013 |
| JP | 2013153627 A | 8/2013 |
| JP | 2017512452 A | 5/2017 |
| KR | 101974070 B1 | 4/2019 |
| WO | 2010090333 A1 | 8/2010 |
| WO | 20150128450 A1 | 9/2015 |

OTHER PUBLICATIONS

Japanese Patent Office, Notice of Reasons for Refusal for JP application No. 2022-515098, dated May 30, 2023.

* cited by examiner

*Primary Examiner* — Joseph Chang
(74) *Attorney, Agent, or Firm* — Miller Johnson

(57) ABSTRACT

An inductive power transfer pad for inductive power transfer to a vehicle includes a stationary part and a movable part. The movable part is movable between a retracted state and an extended state. The movable part includes a primary winding structure and at least one inverter that is electrically connected to the primary winding structure.

26 Claims, 3 Drawing Sheets

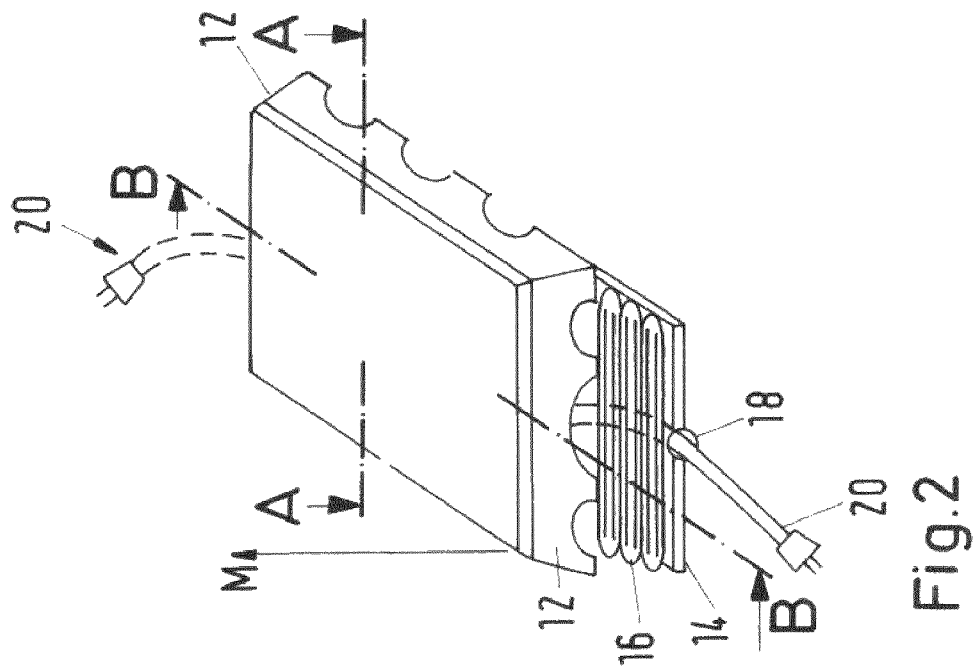
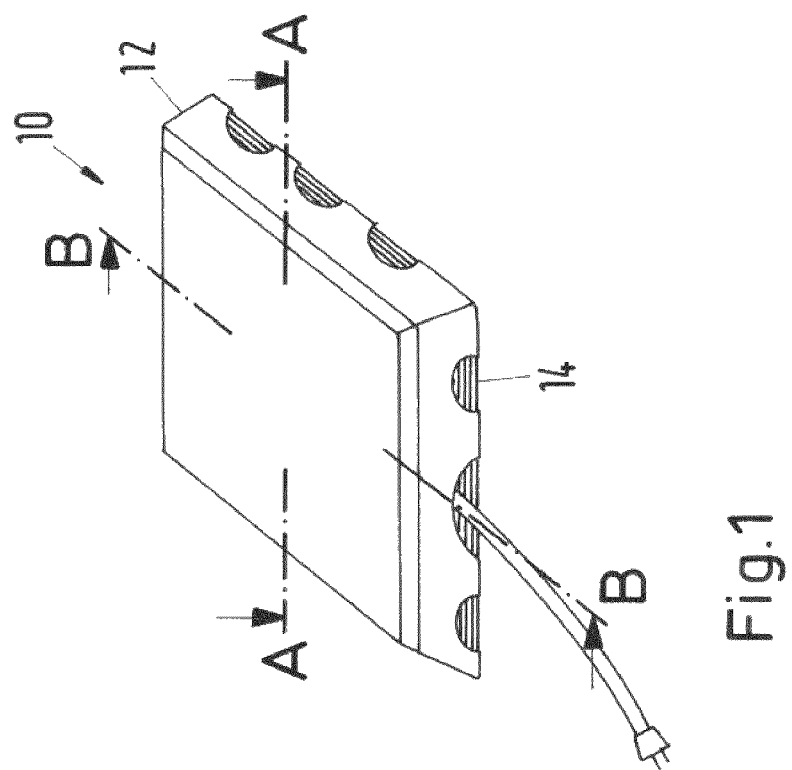
Fig.1
Fig.2

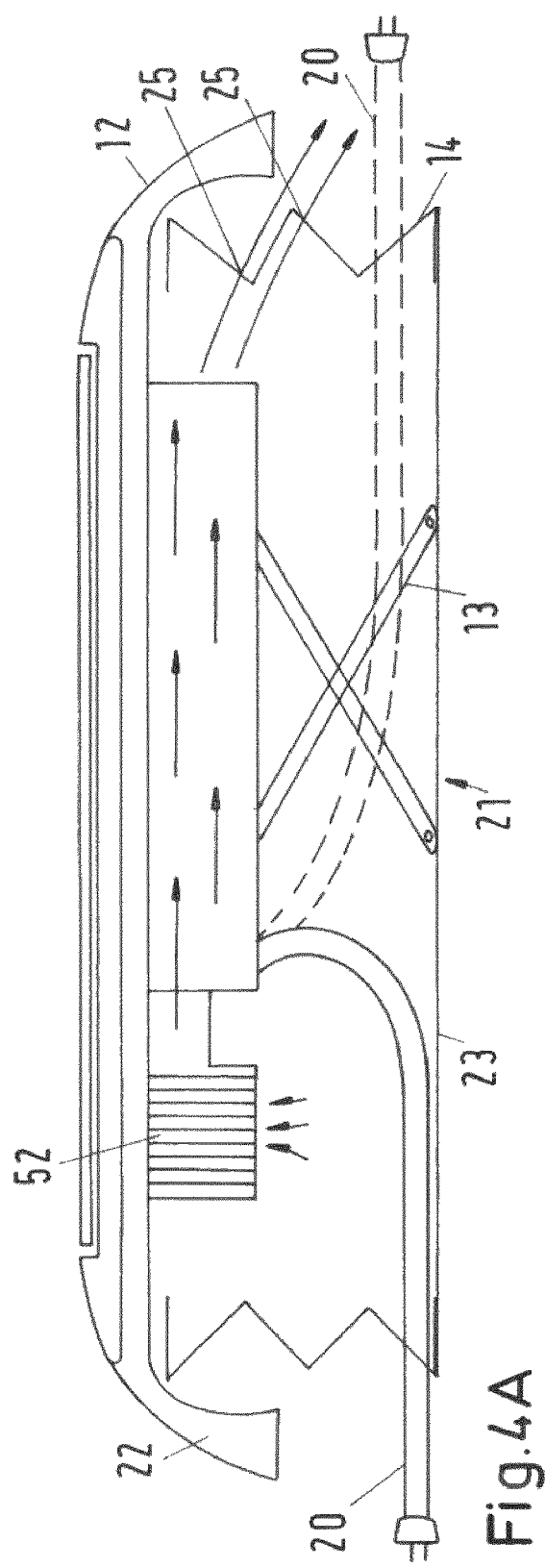
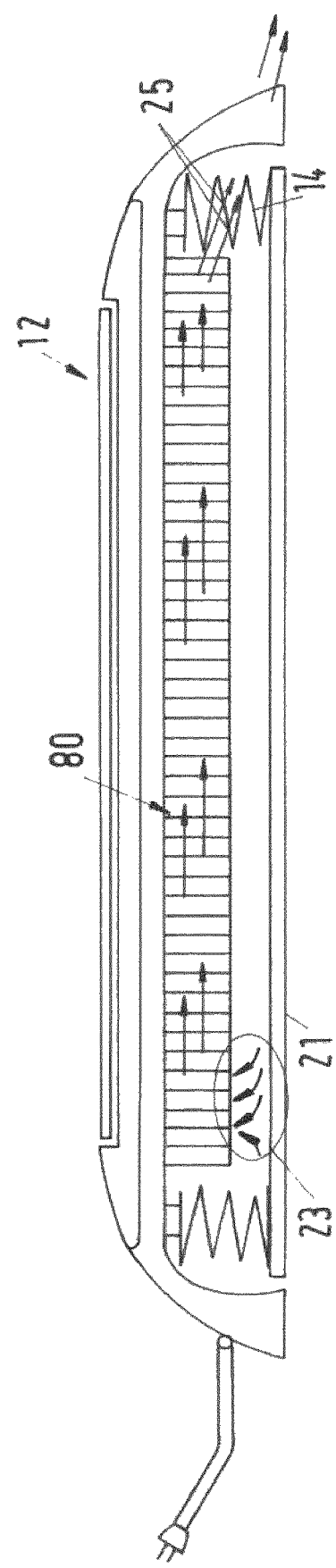

INDUCTIVE POWER TRANSFER PAD AND METHOD FOR PRODUCING AN INDUCTIVE POWER TRANSFER PAD

CROSS-REFERENCE TO RELATED APPLICATIONS

This application is a continuation of International Application No. PCT/EP2020/075116 filed Sep. 8, 2020, which claims priority to GB Application No. 1912955.0 filed Sep. 9, 2019. The entire disclosures of the above applications are incorporated by reference.

FIELD

The invention relates to an inductive power transfer pad and a method for producing an inductive power transfer pad, in particular with regard to inductive power transfer pads for transferring electrical energy to vehicles.

BACKGROUND

Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two sets of e.g. three-phase windings. A first set is installed on the ground (primary windings) and can be fed by a wayside power converter (WPC). The second set of windings is installed on the vehicle. For example, the second set of windings can be attached underneath the vehicle, in the case of trams under some of its wagons. For an automobile it can be attached to the vehicle chassis.

The second set of windings or, generally, the secondary side is often referred to as pick-up-arrangement or receiver. The first set of windings and the second set of windings form a high frequency transformer to transfer electric energy to the vehicle. This can be done in a static state (when there is no movement of the vehicle) and in a dynamic state (when the vehicle moves).

In particular in the case of road automobiles, a stationary primary unit comprises a plurality of elements which are often arranged spatially separated. Typical known inductive power transfer systems comprise a movable primary element to decrease in air gap between a primary and secondary unit. U.S. Pat. No. 5,654,621 discloses an inductive transmitter having a primary element and a secondary element which is attached to the vehicle, wherein the primary element is power driven to move in all three spatial coordinates within a predetermined spatial area. WO 2015/128450 A1 similarly discloses a movable primary element housing a primary winding structure.

So far, the movable (primary) element typically only houses a primary winding structure but not the power electronics, such as an inverter, for providing the primary winding structure with electrical energy. Instead, as e.g. the case in WO 2015/128450 A1, such further components are arranged in the stationary part.

SUMMARY

Currently available inductive power transfer pads and especially those comprising movable parts may still suffer from drawbacks in terms of high production costs and reliability.

It is thus an object of the invention to improve inductive power transfer pads, and in particular inductive power transfer pads comprising a movable part, in terms of costs and/or reliability.

This object is solved by a device and a method according to the attached independent claims. Advantageous embodiments are defined in the dependent claims. Moreover, the features mentioned in the introductory part of this description may, individually or in any combination thereof, also be provided in the presently disclosed solution, if not mentioned or evident otherwise.

The inventors have discovered that separating the power electronics and the primary winding structure by placing one in a stationary part and one and a movable part of the inductive power transfer pad is accompanied with a number of disadvantages.

First of all, electric connections (i.e. cables) need to be provided for connecting the power electronics in the stationary part with the primary winding structure in the movable part. Due to movement, the cables frequently move as well and may experience stress. This increases the risk of damages (e.g. cable breaks), thereby lowering reliability. Also, these cables may be relatively long and represent a cost factor as such.

Still further, even though a space between the movable part and stationary part may at least partially be surrounded by a cover member (e.g. by a foldable and/or flexible bellow), it is often required to seal the winding structure and/or power electronics and in particular any electric connections therebetween. This may in particular include a waterproof sealing. Yet, by distributing the mentioned components between the movable and stationary part, additional (electrical) interfaces and/or connecting terminals need to be provided at the movable and stationary part. Each of the number of interfaces and connecting terminals needs to be sealed or, differently put, needs to form a sealed connection with e.g. a cable connecting the movable and stationary part. This increases costs and efforts.

Another consequence of distributing the mentioned components between the movable and stationary part is that separate housing components need to be provided for each of these components. This increases tooling costs for producing a respective number of separate housing components, e.g. by injection molding or die casting.

Still further, when viewed from above (e.g. when looking downwards onto the inductive power transfer pad), the stationary part and movable part are typically arranged next to one another (i.e. do not fully overlap or do not overlap at all). This is necessary to limit a height of the power transfer pad when the movable part is in a retracted state. Yet, this increases the size and more specifically at least the horizontal dimensions of the power transfer pad. This size increase is accompanied with a cost increase for e.g. respectively large housing components.

Finally, the power electronics and in particular inverters often need to be cooled. When being placed in the stationary part, providing efficient cooling has so far been difficult. For example, due to the stationary part being typically at least partially exposed and not fully covered by the movable part there is a risk of the movable part being touched by a user. Therefore, the power electronics, which act as heat sources, can often not be placed close to surfaces of the stationary part. Instead, they need to be e.g. provided at a distance to exterior surfaces thereof. This, however, makes it difficult to conduct heat from within the stationary part into the surroundings and may require additional costly measures, such as strong airflow circulation fans, additional metallic cooling fins or cooling plates or channels for circulating an airflow within the stationary part. If using an airflow for cooling, the airflow typically has to be guided along long distances and in particular has to be circulated within the stationary part, thereby limiting its heat removing capacity.

In order to overcome at least some of the above issues, this disclosure generally suggests placing both of an inverter (or the power electronics for energizing the primary winding structure in general) and the primary winding structure in the movable part.

This enables electric connections (i.e. cables) between the inverter and the primary winding structure to be shorter which reduces costs. Also, since the inverter and primary winding structure are jointly moved and do not move relative to one another, the electric connections therebetween are extended and/or stressed to a lesser extent as well. This limits a risk of damages and increases reliability.

Moreover, the inverter and primary winding structure may be arranged in an at least partially or even fully overlapping manner, thereby reducing the size (and in particular footprint) of the inductive power transfer pad. This provides a cost saving potential as well.

Still further, the number of (separate) housing components can be reduced. According to one embodiment, a housing component of the movable part accommodates the inverter and at least mechanically supports the primary winding structure or accommodates it as well. Thus, production tooling costs can be reduced.

In more detail, an inductive power transfer pad is proposed, in particular a power transfer pad of a system for inductive power transfer to a vehicle, comprising a stationary part and a movable part, wherein the movable part is movable (e.g. relative to the stationary part) between a retracted state and an extended state, wherein the movable part further comprises a primary winding structure and at least one inverter that is electrically connected to the primary winding structure. The inverter may generally be configured to energize the primary winding structure, such that the inductive power transfer can take place (i.e. such that it produces a desired electromagnetic field of e.g. a desired strength).

The inductive power transfer pad can be part of a primary unit of a system for inductive power transfer. The primary winding structure is configured to generate an alternating (electro-) magnetic field if the primary winding structure is energized or supplied with an operating current, e.g. by the inverter.

The power transfer pad can comprise at least one actuator, wherein the movable part is movable by the at least one actuator. In the context of this invention, the term "actuator" can denote an entity of all components or elements by which the movement of the movable part is generated. The term "actuator" can thus comprise at least one actuating means and/or at least one lifting mechanism. Further, the actuating means can comprise coupling means for mechanically coupling the actuator and the lifting means and/or at least one guiding means for guiding the movement of the movable part. Known guiding means are scissor legs that connect the movable part and stationary part.

The movable part can be movable at least in a first direction (movement direction), in particular by the at least one actuator. The first direction can be oriented in parallel to a main propagation direction of the electromagnetic field generated by the primary winding structure. In particular, the first direction can be oriented perpendicular to the bottom surface of the power transfer pad or a surface of the ground on which the power transfer pad is mounted, wherein the first direction is directed away from the ground. A reverse movement is equally possible to assume the retracted state.

In one example, the first direction coincides with a vertical direction and thus with an axis of the gravitational force. In the following, terms as "upper", "lower", "above", "under", "lowest", "highest", "bottom" refer to the vertical direction.

In the retracted state, the movable part, in particular an upper surface of the movable part, can be positioned at a retracted position, in particular with respect to the first direction, e.g. a predetermined lowest vertical position. In the retracted state, a height of the power transfer pad, i.e. a distance of the highest portion of the power transfer pad, e.g. the upper surface of the movable part, from a mounting portion of the power transfer pad along the first direction can be minimal. Correspondingly, in the extended state, the movable part, in particular an upper surface of the movable part, can be positioned at an extended position, e.g. a predetermined highest vertical position. In the extended state, the height of the power transfer pad can be maximal. The mounting portion can correspond to a bottom surface of the power transfer pad and in particular a stationary part. The mounting portion can be used to mount the power transfer pad to a mounting structure, in particular to a floor surface. The retracted state and the extended state can be defined by mechanical elements, e.g. stop elements, and/or by the design of the actuator.

The (vertical) height of the power transfer pad in the retracted state can be chosen from an interval from 50 mm to 110 mm, in particular from an interval from 70 mm to 90 mm.

Preferably, the height in the retracted state can be equal to 80 mm. The height in the extended state can e.g. be chosen from an interval of 95 mm to 155 mm, in particular from an interval from 115 mm to 135 mm. Preferably, the height in the extended state can be equal to 125 mm.

The primary winding structure may comprise at least one phase line, e.g. carrying one phase of an alternating current. The at least one phase line of the primary winding structure can have a meandering course or looped course. In one example, at least one phase line of the primary winding structure can be designed such that a course of the phase line provides an even number or uneven number of sub-windings which are arranged adjacent to each other. In this context, a sub-winding denotes a, preferably complete, conductor loop, which encloses a predetermined area. The conductor loop can provide or comprise one turn or multiple turns of a respective sub-winding. Adjacent to each other means that central axes of the sub-windings, in particular the axes of symmetry, are spaced apart from one another, e.g. with a predetermined distance, along a common straight line which can e.g. correspond to a direction of extension of the primary winding structure. Further, the course of at least one phase line of the primary winding structure can be 8-shaped. This means that the phase line comprises two, e.g. circularshaped, sub-windings which are arranged adjacent to each other. In particular, the primary winding structure can comprise three phase lines.

Further, the inductive power transfer pad, and more specifically the movable part, can comprise a cable bearing element. The cable bearing element can be adapted position and/or to hold the primary winding structure and in particular line sections and/or phase lines thereof in place. This may be done by providing recesses and/or grooves, in which the line sections of phase lines are placed to define and maintain any of the above-mentioned sub-windings, courses or loops.

The cable bearing element may be made of a non-metallic material, such as a plastic material. It may be supported by and/or at least partially overlap or at least partially cover a base member of the movable part discussed below. The cable bearing element and the base member may be surrounded by a sealing cover and/or may be connected to one another by means of a seal or the a seal positioned between them. In particular, a waterproof connection and/or seal may be provided between the cable bearing element and the base member. Still further, the cable bearing element (and/or an outer cover connected to the cable bearing element and enclosing the primary winding structure at least partially between the cover and the cable bearing element) may act as a cover for the base member and in particular for components arranged therein (e.g. the inverter).

In general, the movable member may encapsulate the primary winding structure and inverter in a preferably waterproof manner to increase reliability. This is e.g. achieved by means of the above arrangements of a cable bearing element, in outer cover and/or a base member in a particularly reliable and cost-efficient manner.

Further, the inductive power transfer pad, in particular the movable part, can comprise a magnetic shielding element. The magnetic shielding element can be used to shield an external area of the power transfer pad from an electromagnetic field generated during inductive power transfer. The movable part and in particular housing components thereof and/or the base member discussed below may provide a respective magnetic shielding function and/or act as respective magnetic shielding elements. Yet, additional magnetic shielding elements may be provided as well, e.g. at least covering the inverter and in particular a portion thereof facing the primary winding structure.

According to a further embodiment, the movable part is free of any electric connections to the stationary part, i.e. is not electrically connected thereto. This limits the amount of electrical connections between these parts and in particular electrical interfaces which need to be sealed.

Alternatively, electric connections may be present but the movable part (or at least the primary winding structure) may not receive any electrical power from the stationary part or only a lesser amount, than needed for energizing the primary winding structure. In case an actuator is integrated into the stationary part, which is possible according to the invention but not preferred, the movable part may forward electrical power to the actuator and thereby to the stationary part, but it preferably does not receive electric power from the stationary part.

According to a further embodiment, the stationary part is free of any electric components and in particular electric components for energizing the primary winding structure. The stationary part may thus be a mere mechanical system and e.g. provide stability and support for the movable part. In case electric components are comprised by the stationary part, these preferably do not enable a movement of the movable part and/or the generation of an electrical field by means of the primary winding structure. In particular, in case electric components are comprised by the stationary part, these preferably do not interact with and/or are not connected to the movable part. Again, this limits cables between these parts as well as electric interfaces which need to be sealed.

In a further example, for connecting to an external power source the movable part comprises a connecting terminal (e.g. for a connecting cable) and/or a connecting cable. The movable part may thus be connected or connectable to the connecting cable, e.g. via the connection terminal. The external power source may be a household power supply or household power grid, e.g. connected to a public grid. The connecting cable may thus comprise a plug for connecting to a socket. The plug may be exchangeable for adapting to local norms and standards. Also, a length of the cable may be adjustable, for example by the connecting cable including an interface to which further cable sections, preferably including a plug, can be connected.

The connecting cable may be interchangeably connectable to the connecting terminal, e.g. by manual insertion and removal. Alternatively, it may be fixed to the connecting terminal such that no manual insertion and removal, e.g. by means of a mere manual push or pull operation is possible. For example, the connecting cable may be welded, soldered or adhered and thereby fixed to the connecting terminal. Additionally or alternatively, a preferably permanent wire connection may be formed between the cable and the connecting terminal which is not removable by a user without tools and/or without destruction of the wire connection.

The connecting terminal may be positioned in a space that is at least partially surrounded by a cover member discussed below. The connecting cable may be guided from within the space to the outside. For doing so, openings may be provided e.g. within the cover member (see below). It is generally contemplated that the connecting terminal remains in a fixed position, but that a course of the connecting cable from the inductive power transfer pad to the external power source can be flexibly adjusted, e.g. by the connecting cable having various options to be guided from within the above space to the outside. This way, the user has options of how to place the connecting cable and may e.g. avoid that he has to drive across it (and the vehicle thus temporarily squeezing the cable) for positioning his vehicle above the inductive power transfer pad.

In one preferred example, the connecting cable can be guided from within the above space to the outside at least at a first side of the inductive power transfer pad and at a second side, wherein the first and second side preferably lie at opposite ends, sides or faces of the inductive power transfer pad.

According to a further embodiment, the inductive power transfer pad further comprises an actuator for moving the movable part, wherein the actuator is electrically connected to and/or powered by the movable part. In particular, the actuator may receive power for moving the movable part from the movable part. A connecting terminal of the actuator may be positioned such that it is not movable relative to the movable part, e.g. at a portion of the actuator that is fixed to the movable part. This limits movements of the electrical connection between the movable part and the actuator and in particular frequent extensions or compressions thereof, thus limiting a risk of cable breaks.

Also, the electrical connection between the movable part and the actuator may be formed within a space largely surrounded by a cover member as discussed herein. This may limit requirements in terms of sealing compared to this connection being formed at an exterior portion of the inductive power transfer pad.

Further, the movable part may be configured to supply the actuator with electric power from the external power source. Differently put, power from the external power source may be guided and/or forwarded to the movable part and from there it may be forwarded to the actuator. This way, the actuator does not need to be directly connected to the external power source which limits the number of separate power cables and associated costs.

Generally, the inductive power transfer pad may comprise only one cable or connection for connecting to an external power source and this cable or connection may be comprised by and/or connected to the movable part. The movable part may then act as a distributor for distributing power received from the external power source to further units, such as the inverter, the actuator mentioned above or an airflow generating unit mentioned below.

The actuator may generally comprise an extendable and retractable cylinder or a similar extendable and retractable mechanical member. For providing the respective extension or retraction, the actuator may comprise an electric motor or an electric pump, e.g. an electrically driven hydraulic or pneumatic pump.

According to a further example, the actuator mechanically rests against the stationary part. Differently put, the actuator may be supported by the stationary part, e.g. such that an extension thereof uses the stationary part as a fixed base in order to push the movable part upwards relative to the stationary part. The actuator may e.g. be fixed directly or indirectly to the stationary part. Additionally or alternatively, the actuator may generally be fixed directly or indirectly to the movable part and/or may rest against the movable part. Yet, as noted above, there is preferably no electric connection to the stationary part and the power for the actuator is provided by the movable part e.g. by connecting the movable part to the external power source.

According to a further embodiment, the inductive power transfer pad further comprises an airflow-generating unit, wherein the airflow-generating unit is electrically connected to in/or powered by the movable part. The airflow generating unit may e.g. be jointly movable with the movable part. The electric connection may be formed such that no relative movements to the movable part occur, e.g. by placing a cable between the movable part and a connecting terminal of the airflow generating unit, the connecting terminal (or the airflow generating unit in general) being fixed at and/or being stationary relative to the movable part. This limits the required cable length and thus costs and limits the risk of cable breaks.

The airflow generating unit may be or comprise a fan. It may generate an airflow that is directed to or along a portion of the movable part, e.g. to or along an underside thereof facing the stationary part. Generally, the airflow may be directed to or along a portion which is close to heat sources, such as the inverter or other electrical components. Thus, it may be directed to or along surfaces or portions of e.g. a base member of the movable part which houses the inverter or electrical components. The airflow may at least partially flow within a space surrounded by a cover member discussed below.

The movable part may be configured to supply the airflow-generating unit with electric power from the external power source. Similar to the power supply of the actuator discussed above, this may be achieved by guiding electrical power from the external power source through the movable part and to the airflow generating unit.

In this context, the airflow-generating unit may be positioned at or in the movable part.

This enables a joint movement of the airflow generating unit and movable part which is preferable in many ways for providing damage free and cheap electric connections therebetween.

For example, the airflow generating unit may be placed at an underside of the movable part facing the stationary part. Specifically, it may be positioned within a space enclosed by the cover member discussed below. Additionally or alternatively, the airflow generating unit may be placed close to heat sources within the movable part, e.g. adjacent thereto. Also, it may be positioned such that an airflow can be generated along high-temperature portions of the movable part. In one example, the airflow generating unit is positioned at an edge part of the movable part (or at least off-center with respect to the movable part) to direct an airflow along a respectively long portion of the movable part (e.g. along at least half of the length or width of preferably an underside of the movable part).

In one example, the airflow-generating unit may be configured to produce a flow of surrounding air and flowing along and/or within the movable part. In this connection, air may be taken from the surroundings to create the airflow and may then be released into the surroundings again. Thus, the inductive power transfer pad may comprise at least one air intake and at least one air outlet and the airflow generating unit may be configured to create an airflow therebetween. This helps to provide an efficient heat removal e.g. compared to cooling of known stationary parts where air is circulated in long channels, thus heating up quickly and not removing a sufficient amount of heat in all relevant portions.

According to a further embodiment, the movable part comprises a base member which supports (or, differently put, carries) the primary winding structure and/or the inverter, but is not necessarily in contact therewith. The base member may be plate shaped but may comprise grooves, recesses, through holes or the like. It may form an underside of the movable part. To the base member, a guiding means such as scissor legs and/or an actuator for providing the movement force for the movable part may be attached. The base member may form part of a preferably sealed and more preferably waterproof sealed encapsulation provided by the movable part for housing the inverter and/or primary winding structure.

In this connection, the inverter may at least partially be positioned between the base member and the primary winding structure, in particular when viewed along an axis of movement of the movable part (e.g. when viewed along a vertical axis). For example, the inverter may be covered on at least one side by the base member and preferably at least on three or five sides. This may e.g. be achieved by, according to a further embodiment, the inverter being at least partially arranged in a recess within the base member. This helps to protect the inverter from external influences, such as moisture. Also, this helps to arrange the inverter (which generally represent a potential heat source) close to the base member and thus close to the exterior. Thus, heat from the inverter may be efficiently conducted to the outside. For example, a generated airflow may be directed along a portion of the base member that is close to and in particular receives the inverter.

Generally, the inverter may be arranged at a side of the base member facing the primary winding structure. An airflow generating unit, on the other hand, may be positioned at an opposite side, such as an underside of the base member. The latter enables an efficient cooling by directing an airflow along an outer side of the base member, without having to provide air inlets or outlets within the movable member. Such inlets or outlets would result in substantial sealing efforts, due to additional interfaces and/or openings being provided in the movable member through which moisture could enter.

In one example, a plurality of electric components is provided which are e.g. summarized in at least two groups or functional units. Each of the groups of functional units is arranged in a recess within the base member. Preferably, an airflow generating unit is provided between these recesses (but possibly at an opposite side of the base member, e.g. at an underside thereof). This provides an efficient cooling since heat sources can be spatially distributed, thus avoiding high local heat concentration. Also, heat removal from both groups of heat sources may be achieved by possibly only one airflow generating unit.

The recesses may form projections at an underside of the base member. Adjacent recesses (or, more precisely, the projections created thereby) may confine a channel or groove (e.g. by defining respective sidewalls thereof). This channel or in general the recesses may thus guide an airflow created by the airflow generating unit in a desired manner along the base member. This limits additional parts needed so far for defining respective channels and thus reduces production costs.

In a preferred example, the base member is made of a metallic material. Generally, a metallic material with an above average thermal conduction coefficient with respect to metallic materials may be selected. By choosing a metallic material, an efficient heat removal from heat sources, such as the inverter, housed within the movable member is achieved, in particular when directing an airflow along an outside of the base member. Also, producing the base member by die casting or injection molding may thus be possible which is beneficial in terms of costs.

Generally, the movable part and the stationary part may be arranged in a largely or even fully overlapping manner, to limit the size and size-related costs of the inductive power transfer pad. Accordingly, when viewed along an axis of movement of the movable part, the movable part and stationary part may be arranged above one another even in the retracted state of the movable part, but not completely next to one another. Also, when in the retracted state, the movable part may act as a cover for the stationary part or for a cover member discussed herein. This helps to protect the stationary part or cover member from damages and provides a cost saving potential, since design requirements of the components in terms of durability can be reduced.

For example, according to one aspect, the movable part covers an area of at least 80% of the area covered by the stationary part. This area may relate to an area in the horizontal spatial plane and/or in a plane that extends orthogonally to a movement direction of the movable member. This way, the at least partial overlap of the movable part and stationary part may be achieved.

Additionally or alternatively, a footprint of the movable part is at least as large as the footprint of the stationary part or its size is at least 80% of the footprint's size of the stationary part. Again, the footprint may relate to a shape or circumference of the relevant part when projected into a horizontal spatial plane and/or a plane extending orthogonally to a movement direction of the movable part.

According to a further aspect, a space between the movable part the stationary part is at least partially surrounded by a cover member. The space may define a volume between the movable part and stationary part that increases and decreases as a function of a movement of the movable part relative to the stationary part (e.g. is maximum at an extended state a minimum at a retracted state of the movable part).

The space may be cylindrical and at least a part of the stationary part and a movable part may define or extend in parallel to base planes of the cylindrical space. The cover member may define or constrict a side surface or shell surface of the cylindrical space. Generally, the cover member may surround the space on four sides.

The inverter, any further heat source, any electric component and/or at least part of the primary winding structure may be positioned in or above the space. Differently put, they may be arranged so as to at least partially overlap with the space or at least with a footprint of the space (e.g. when viewed from above). In particular, when viewed along a movement axis of the movable part and/or when virtually extending a shell surface of the space to extend beyond of the cover member (e.g. along the axis of movement), any of the members may be positioned within the (virtual) space.

The cover member may comprise holes, e.g. for guiding a cable for connecting to an external power source therethrough. Yet, the cover member has a preferably largely or even fully closed surface (e.g. a size of potential holes therein being smaller than 5% of the total area of the cover member).

The cover member may be made of a flexible or resilient material and may e.g. comprise a rubber or plastic material. It may include folds or other predetermined deformable sections. In one example, the cover member is a foldable bellow that folds and unfolds in accordance with a movement of the movable part.

According to a further embodiment, the inverter is positioned closer to an underside of the movable member facing the space surrounded by the cover member (or facing the stationary part), then to an upper side of the movable member facing the surroundings. This is advantageous in terms of heat management since generated heat may be conducted into the space and removed from the space e.g. via an airflow generating unit discussed herein. Also, this results in a space efficient arrangement. Generally, the inverter is preferably placed below of the primary winding structure and preferably overlaps therewith (i.e. the inverter and primary winding structure been stacked on top of one another).

In one example, the airflow generating unit is positioned at an underside of the movable member facing the stationary part and/or the space surrounded by the cover member (e.g. at an underside of the base member of the movable member). Specifically, the airflow generating unit may be placed within the space surrounded by the cover member.

Additionally or alternatively, the airflow generating unit is positioned closer to the underside then to an upper side of the movable member facing the surroundings. Since, as is generally preferred, heat sources such as the inverter will be placed below of the primary winding structure and thus close to the underside as well, the above placement of the airflow generating unit enables an efficient heat removal.

According to a further aspect, a cable for supplying electric power to the movable part from an external power source is connectable or connected to the movable part within the space. Differently put, the cable may be guided from the surroundings of the inductive power transfer pad into the space and then connected within the space to the movable part (e.g. to a connecting terminal thereof). Thus, this connection to the movable part may at least partially be surrounded by the cover member, which may limit requirements in terms of additional sealing. As previously noted, the cover member may comprise a predetermined opening for guiding the cable therethrough.

For example, the inductive power transfer pad (e.g. the stationary part or a gap formed between the stationary part and the cover member) and in particular the cover member may comprise at least two openings or two predetermined openable portions (e.g. comprising a removable cover or a locally limited material strength) for guiding the cable to the external power source therethrough. Thus, a user may decide how the cable should be placed relative to the inductive power transfer pad. Generally, the openings or openable portions may be placed at a distance to one another or at different sides of the inductive power transfer pad. For example, the openings or openable portions may be positioned such that the cable may be positioned and respectively leave the inductive power transfer pad at different sides of the inductive power transfer pad, e.g. at a front side or a backside. This increases the installation flexibility of the inductive power transfer pad. Also, this helps to guide the cable in such a manner that having to cross it (i.e. driving over and squeezing it) can be avoided when positioning a vehicle above the inductive power transfer pad.

Generally, the movable part may house, or differently put encapsulate, the inverter and primary winding structure such that these are sealed from the surroundings, in particular in a waterproof manner. This limits production efforts and associated costs compared to known solutions in which separate housings and separate scalings at the stationary part and movable part have to be provided for the electric components positioned therein. Instead, with the solution disclosed herein, part numbers, housing portions and/or a number or length of required seals as well as associated production and assembly steps can be reduced.

As noted above, the inductive power transfer pad may further comprise at least one of:
- at least one air intake (e.g. in a cover member discussed herein or in openings or gaps in or below of the stationary part), through which the airflow generating unit can suck in air from the surroundings; and
- at least one air outlet (e.g. in a cover member discussed herein or in openings or gaps in or below of the stationary part), through which air from an airflow generated by the airflow generating unit can escape into the surroundings.

Furthermore, a method for manufacturing an inductive power transfer pad is suggested, in particular a power transfer pad of a system for inductive power transfer to a vehicle, the inductive power transfer pad comprising a stationary part and a movable part, wherein the movable part is movable between a retracted state and an extended state, the method comprising:
- arranging a primary winding structure and at least one inverter that is electrically connected to the primary winding structure in the movable part.

The method may comprise any further step, any development or any further feature in order to provide any of the previously or subsequently discussed interactions, operating states or functions and for providing or integrating any of the further members of an inductive power transfer pad. Specifically, any of the previous or subsequent explanations and developments regarding the device-features may also apply to the equivalent method-features. In general, the method may include producing an inductive power transfer pad according to any of the previous or subsequent aspects.

BRIEF DESCRIPTION OF THE DRAWINGS

In the following, an embodiment of the invention will be described with reference to the attached schematic figures. Features which correspond to one another with regard to their type and/or function may be assigned the same reference signs throughout the figures.

FIG. 1 shows an inductive power transfer pad according to an embodiment of the invention, that has been produced with a method according to an embodiment of the invention, in a retracted state.

FIG. 2 shows the inductive power transfer pad of FIG. 1 in an extended state.

FIG. 4A is a cross-sectional view along axis B-B of FIG. 1.

FIG. 4B is a cross-sectional view along axis B-B of FIG. 2.

DETAILED DESCRIPTION

Figure 3A:
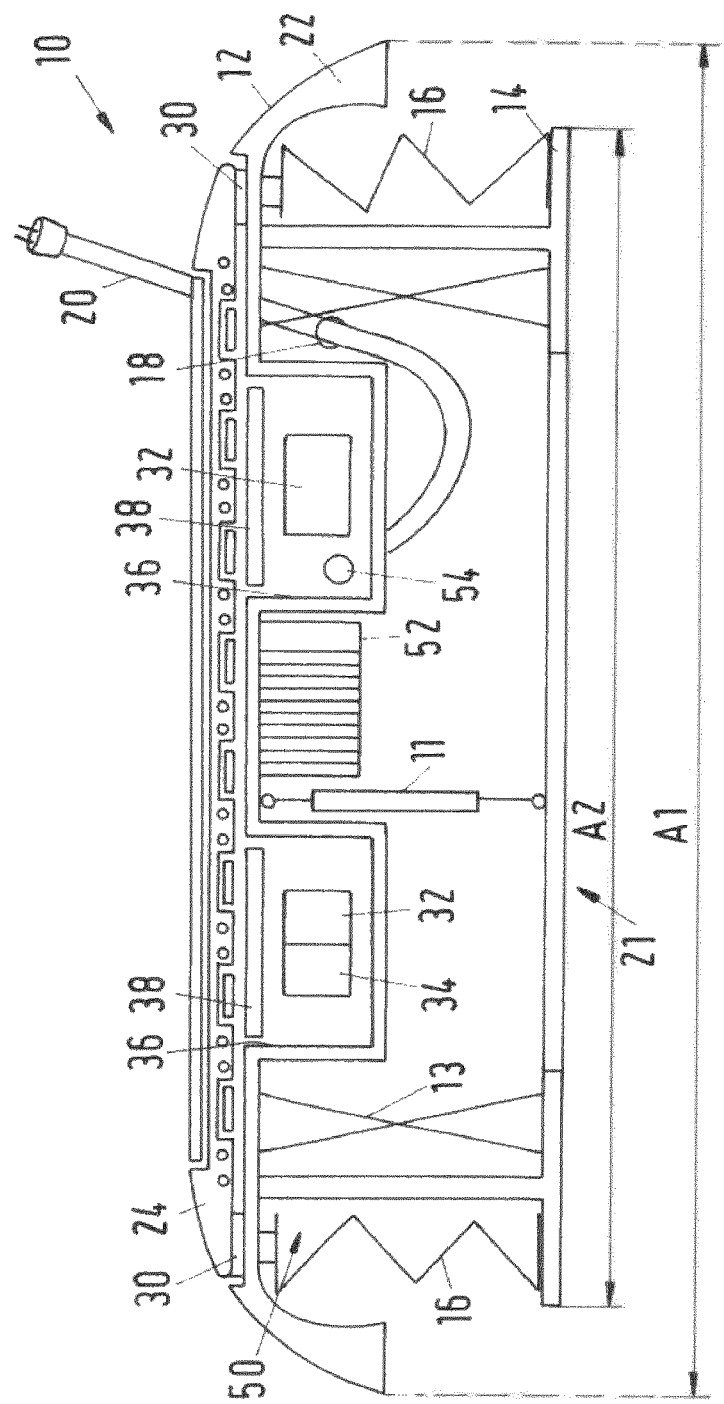
FIG. 3A is a cross-sectional view along axis A-A of FIG. 1.

In FIG. 1, an inductive power transfer pad 10, in the following also only referred to as pad 10, is shown. The pad 10 comprises a movable part 12 that is movable with respect to a ground surface on which a largely covered stationary (i.e. non-movable) part 14 of the pad 10 is positioned. In the shown state, the movable part 12 is in a retracted state. The inductive power transfer pad 10 thus largely extends in parallel to a horizontal spatial plane.

To the contrary, in FIG. 2, the movable part 12 is shown in an extended state. For doing so, it is moved (i.e. lifted) by means of an actuator discussed below along a movement axis M which coincides with a vertical spatial axis. For returning to the retracted state of FIG. 1, a movement in an opposite direction along the movement axis M takes place.

It can be seen that the movable part 12 and the stationary part 14 are connected to one another by means of a cover member 16. The cover member 16 is configured as a foldable bellow that folds and unfolds in accordance with a movement of the movable part 12. The cover member 16 confines a space between the movable part 12 and stationary part 14 as will be discussed in further detail below.

The cover member 16 comprises an opening 18 at a side of the pad 10 facing the viewer in FIG. 2. Through the opening 18, a cable 20 (e.g. a grate cable) can be guided for connecting to an external power source (not shown), such as a public grid. The cable 20 is the only connection of the pad 10 to an external power source. As indicated in the upper portion of FIG. 2, the cable 20 can also be guided with a different orientation from the pad 10 to the external power source. For doing so, a similar opening 18 is provided at an opposite side of the cover member 16.

Both of the openings 18 are already present when delivered to the customer or they are manually openable due to having a removable cover or a limited material strength that can easily be pierced. The customer thus has at least two options for guiding the cable 20 towards the external power source. This way, he can place the cable 20 according to the local conditions and in particular such that he does not have to drive over it with the vehicle (e.g. by approaching the pad 10 from the side facing away from the cable 20 and then driving backwards when leaving the pad 10).

Instead of an opening 18 in the cover member 16, an opening or openable portion in the stationary part can equally be provided. Likewise, a gap between the cover member 14 and the stationary part could be provided and used as a respective opening.

Figure 3B:
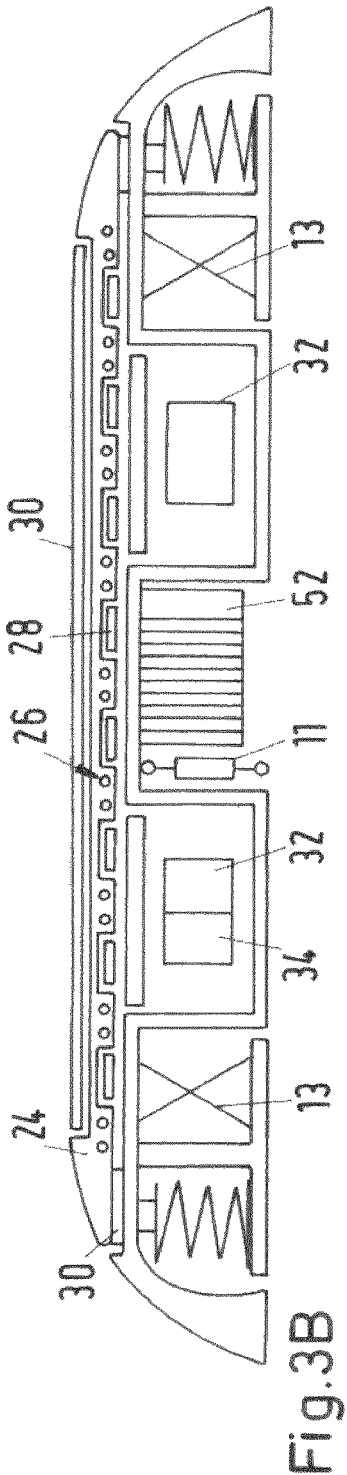
FIG. 3B is a cross-sectional view along axis A-A of FIG. 2.

In the following, views of cross sections according to the axes A-A and will be discussed. FIGS. 3A and 3B, which will be jointly discussed in the following even though some reference signs may only be provided in one and not both of these figures, show cross-sections according to the axis A-A. FIG. 3A shows the elevated or extended state of FIG. 2 and FIG. 3B shows the retracted state of FIG. 1.

As standard and known components of inductive power transfer pad 10, it is shown that an actuator 11 in form of an electrically driven extendable cylinder is present which moves the movable part 12 up and down with respect to the stationary part 14. Moreover, a guiding means 13 or, differently put, a mechanical structure supporting the movement, is provided in form of two standard scissor leg mechanisms 13.

Moreover, the stationary part 14 is configured as a frame like member having a central opening 21 which connects the space 50 discussed below to the surroundings. The stationary part 14 does not comprise any electrical components and is also free of any electrical connections to the movable part 12. Yet, the actuator 11 is fixed two the stationary part 14 and mechanically rest against it when pushing the movable part 12 upwards or pulling it downwards. Compared to known solutions, the stationary part 14 is thus rather small and cheap to produce due to its limited size, large opening 21 and by having a simple frame like design.

The movable part 12 comprises a base member 22 made of a metallic material and, in the shown case, made of aluminum. The base member 22 is preferably produced by die casting. It is generally configured as a flat plate-type member with, however, some recesses, protrusions, overhangs and the like (i.e. not defining a perfect plane). An underside of the base member 22 faces the stationary part 12 and forms an underside of the overall movable part 12.

An area or footprint A1 covered by the base member 22 and thus of the movable part 12 exceeds a corresponding area or footprint A2 of the stationary part 14. Differently put, the base member 22 and thus the movable part 12 completely covers the stationary part 14. This is advantageous e.g. in that the stationary part 14 but also the cover member 16 are protected from the environment by the base member 22 in particular when the latter is in a retracted state.

On top of the base member 22, a cable bearing element 24 is placed which is made of a plastic material. The cable bearing element 24 comprises recesses in which, in a generally known manner, phase lines of a primary winding structure 26 are positioned.

The configuration of the cable bearing element 24 and primary winding structure 26 is not a focus of the present solution and can be implemented according to known solutions.

This also concerns standard ferrite elements 28 which are provided at an underside of the primary winding structure 26. Still further, a non-specifically illustrated foreign object detection system may be included and comprise known detection windings. The cable bearing element 24 is covered by a flat cover member 30 forming an upper side of the movable part 12 as well as the pad 10.

The cable bearing element 24 is placed on and thus covers an upper side of the base member 22. Preferably, a seal 30 is placed between the cable bearing element 24 and base member 22.

Coming back to the base member 22, it is shown that groups of electric components 32, e.g. comprising the power electronics of the pad 10 and at least one of which comprises an inverter 34 for energizing the primary winding structure 26, are arranged at the base member 22. More precisely, they are arranged at a side facing the cable bearing element 24, i.e. an upper side of the base member 22.

As a mere example, the base member 22 of the shown embodiment comprises recesses 36 in which the electric components 32 are placed, such that they are at least partially surrounded on five sides. As a further optional, yet preferred measure, the opened side of the recesses 36 is at least partially covered by a shielding element 38 that is configured to electromagnetically shield the primary winding structure 26 and the electronic components 32 from one another.

As obvious from the retracted state in FIG. 3B, providing the recesses 36 has advantages in terms of space efficiency. For example, the recesses 36 may be dimensioned similar to a height of the actuator 11 and/or the guiding means 13 in a retracted state, both of which may be more or less fixed or unchangeable dimensions. Thus, the electrical components and in particular the recesses 36 may not significantly add to the overall height of the power transfer pad 10 but may use the space available due to a mechanically defined minimum height of the pad 10.

Overall, the electric components 32 and in particular the inverter 34 as well as the primary winding structure 26 are housed within the movable part 12 and are preferably encapsulated thereby in a waterproof manner.

Non-specifically shown electrical connections (e.g. cables) between the electric components 32 and in particular the inverter 34 and e.g. the primary winding structure 26 thus have a limited length. Also, due to being both positioned in the movable part 12, the connected elements are not movable relative to one another, so that the cables experience hardly any movements as well. In particular, they are not frequently lifted, unrolled or the like. This limits the risk of cable breaks.

A further advantage is an improved heat management of the pad 10. For example, any of the electric components 32 acts as a heat source. Yet, these are placed close and in fact directly adjacent to an underside of the base member 22. In particular, they are closer to the underside then to an upper side of the movable member 12. Differently put, when viewed along the movement axis M of FIG. 2, the electric components 32 and in particular the inverter 34 is positioned between the base member 22 (or at least an underside thereof) and the primary winding structure 26.

Thus, heat generated by the electric components 32 can be conducted by the metallic base member 22 and in particular its underside into a space 50 between the movable part 12 and the stationary part 14 which is enclosed by the cover member 16. From there, it can be transported into the surroundings by an airflow generating unit 52 (e.g. in form of an electric fan) that produces an airflow as further discussed with respect to FIGS. 4A-4B.

In FIG. 3A, the cable 20 connecting to an external power source can again be seen. Specifically, it can be seen that it enters into the space 50 via an opening 18 (which is not the opening 18 visible in FIG. 2 but the further opening 18 at an opposite side of the pad 10). Further, it can be seen that the cable 20 connects to the movable part 12 and, more specifically, to a connecting terminal 54 while the space 50. To the connecting terminal 54, the electrical components 32 and in particular the inverter 34 are connected (non-specifically illustrated). Thus, power can be supplied from the external power source to the electrical components 32 in particular to the inverter 34 which then energizes the primary winding structure 26. To the contrary, no power from an external power source is provided to the stationary part 14, nor are any electric connections formed between the cable 20 and the stationary part 14 or between the movable part 12 and the stationary part 14 in general.

In FIGS. 4A, 4B cross-sectional views of the pad 10 according to the axis B-B of FIG. 1 are shown. In FIG. 4A, the scissor-like guiding means 13 can again be seen. Also, the two possible ways of arranging the cable 20 are shown as has been previously discussed.

In FIGS. 4A, 4B, it can also be seen that the fan 52 is placed at an edge portion of the underside of the base member 22 and generally off-center with respect to the base member 22. It can thus guide an airflow as indicated by small arrows along a substantial length of the base member 22, thereby removing a substantial amount of heat.

Specifically, the depicted airflow can be guided through a channel formed by and between the recesses 36 and thus very close to the surfaces of the base member 22 adjacent to the heat sources in form of the electric components 32.

Note that the recesses 36 form protrusions at an underside of the base member, is visible in FIGS. 3A-3B. The outer sidewalls 82 of these protrusions which face each other thus define sidewalls of the channel through which the airflow can be guided.

As more specifically indicated in FIG. 4B, air inlets 23 in form of gaps for openings at an underside of the stationary part 14 through which the fan 52 can suck in air from the surroundings. Moreover, air outlets 25 are provided through which the heated air can then be transported back into the surroundings.

Note that as a general aspect of this invention which is not limited to the further details of the embodiments, it would also be possible to use one of the openings 18 through which the cable 20 can (optionally) be guided as an air outlet or air inlet, e.g. by dimensioning at least one of the openings 18 with a respectively large cross-section.

As an optional feature, cooling structures 80 for enlarging a surface area of the base member 22 and in particular of an underside of the base member 22 are shown in FIG. 4B. The cooling structures 80 may e.g. form cooling fins or cooling ribs. This further helps to increase heat removal when guiding an airflow along the cooling structures 80. The phrase "at least one of A, B, and C" should be construed to mean a logical (A OR B OR C), using a non-exclusive logical OR, and should not be construed to mean "at least one of A, at least one of B, and at least one of C."

The invention claimed is:

1. An inductive power transfer pad for inductive power transfer to a vehicle, the inductive power transfer pad comprising:
    a stationary part;
    a movable part; and
    an actuator configured to move the movable part,
        wherein the movable part is movable between a retracted state and an extended state,
        wherein the movable part includes:
            a primary winding structure, and
            an inverter that is electrically connected to the primary winding structure, and
        wherein at least one of:
            the movable part is configured to supply the actuator with electric power from an external power source, and
            the actuator is electrically connected to the movable part.

2. The inductive power transfer pad of claim 1 wherein the movable part is free of any electric connections to the stationary part.

3. The inductive power transfer pad of claim 1 wherein the stationary part is free of any electric components.

4. The inductive power transfer pad of claim 1 wherein the stationary part is free of electric components for energizing the primary winding structure.

5. The inductive power transfer pad of claim 1 wherein the movable part includes at least one of a connecting terminal and a connecting cable for connecting to an external power source.

6. The inductive power transfer pad of claim 1 wherein the actuator mechanically rests against the stationary part.

7. The inductive power transfer pad of claim 1 further comprising an airflow-generating unit electrically connected to the movable part.

8. The inductive power transfer pad of claim 7 wherein the movable part is configured to supply the airflow-generating unit with electric power from an external power source.

9. The inductive power transfer pad of claim 7 wherein the airflow-generating unit is positioned at or in the movable part.

10. The inductive power transfer pad of claim 7 further comprising at least one of:
    an air intake through which the airflow-generating unit can suck in air from the surroundings; and
    an air outlet through which air from an airflow generated by the airflow-generating unit can escape into the surroundings.

11. The inductive power transfer pad of claim 7 wherein the airflow-generating unit is configured to produce a flow of air taken from the surroundings along and/or from within the movable part.

12. The inductive power transfer pad of claim 1 wherein the movable part includes a base member that supports the primary winding structure and the inverter.

13. The inductive power transfer pad of claim 12 wherein the inverter is at least partially positioned between the base member and the primary winding structure.

14. The inductive power transfer pad of claim 12 wherein, when viewed along an axis of movement of the movable part, the inverter is at least partially positioned between the base member and the primary winding structure.

15. The inductive power transfer pad of claim 12 wherein the inverter is at least partially arranged in a recess within the base member.

16. The inductive power transfer pad of claim 12 wherein the base member is made of a metallic material.

17. The inductive power transfer pad of claim 1 wherein the movable part covers an area of at least 80% of the area covered by the stationary part.

18. The inductive power transfer pad of claim 1 wherein a footprint of the movable part is at least as large as a footprint of the stationary part.

19. The inductive power transfer pad of claim 1 wherein a space between the movable part and the stationary part is at least partially surrounded by a cover member.

20. The inductive power transfer pad of claim 19 wherein the inverter is positioned closer to (a) an underside of the movable part facing the space surrounded by the cover member than to (b) an upper side of the movable part facing the surroundings.

21. The inductive power transfer pad of claim 19 further comprising:
    an airflow generating unit electrically connected to the movable part, wherein the airflow generating unit is positioned at an underside of the movable part facing the space surrounded by the cover member.

22. The inductive power transfer pad of claim 19 further comprising:
an airflow generating unit electrically connected to the movable part,
wherein the airflow generating unit is positioned closer to an underside of the movable part facing the space surrounded by the cover member than to an upper side of the movable part facing the surroundings.

23. The inductive power transfer pad of claim 19 wherein a cable configured to supply electric power to the movable part from an external power source is connectable or connected to the movable part within the space.

24. The inductive power transfer pad of claim 23 further comprising at least two openings or two openable portions each of which can be used for guiding the cable to the external power source.

25. The inductive power transfer pad of claim 24 wherein the movable part houses the inverter and the primary winding structure such that these are sealed from the surroundings.

26. A method for manufacturing an inductive power transfer pad for inductive power transfer to a vehicle, the inductive power transfer pad having a stationary part, a movable part, and an actuator configured to move the movable part, the movable part movable between a retracted state and an extended state, the method comprising:
arranging a primary winding structure in the movable part; and
arranging at least one inverter that is electrically connected to the primary winding structure in the movable part, wherein at least one of:
the movable part is configured to supply the actuator with electric power from an external power source, and
the actuator is electrically connected to the movable part.

* * * * *